United States Patent
Bitterlich (10) Patent No.: US 8,190,998 B2
(45) Date of Patent: May 29, 2012

(54) METHOD FOR GENERATING AN OBJECT-PROCESSING PLATFORM BETWEEN TWO COMPUTERS BY JOINING SCREENS

(75) Inventor: Jean-Yves Bitterlich, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/571,503

(22) PCT Filed: Aug. 17, 2004

(86) PCT No.: PCT/EP2004/051812
§ 371 (c)(1),
(2), (4) Date: Mar. 10, 2006

(87) PCT Pub. No.: WO2005/026943
PCT Pub. Date: Mar. 24, 2005

(65) Prior Publication Data
US 2006/0284785 A1    Dec. 21, 2006

(30) Foreign Application Priority Data
Sep. 10, 2003 (EP) .................................. 03020621

(51) Int. Cl.
*G06F 3/00* (2006.01)
*G09G 5/00* (2006.01)
(52) U.S. Cl. .................. 715/748; 345/619; 345/629
(58) Field of Classification Search .................. 345/157, 345/475, 629, 619; 361/686; 715/748
See application file for complete search history.

(56) References Cited

U.S. PATENT DOCUMENTS

| | | | | |
|---|---|---|---|---|
| 5,748,189 A | * | 5/1998 | Trueblood | 715/755 |
| 5,758,110 A | * | 5/1998 | Boss et al. | 715/751 |
| 5,844,553 A | * | 12/1998 | Hao et al. | 715/733 |
| 5,872,924 A | * | 2/1999 | Nakayama et al. | 709/205 |
| 5,886,697 A | * | 3/1999 | Naughton et al. | 345/473 |
| 5,923,307 A | * | 7/1999 | Hogle, IV | 345/4 |
| 5,996,002 A | * | 11/1999 | Katsurabayashi et al. | 709/204 |
| 6,014,135 A | * | 1/2000 | Fernandes | 715/744 |
| 6,018,340 A | * | 1/2000 | Butler et al. | 715/764 |

(Continued)

FOREIGN PATENT DOCUMENTS
CN    1178948    4/1998

OTHER PUBLICATIONS

Cowart, Robert, "Special Edition Using Microsoft Windows XP Home Edition", Publishing Date: Oct. 10, 20011 Remote Desktop, Communicating with Voice, What about NetMeeting?, Chapter 17. Windows Unplugged: Remote and Mobile Networkingv.*

*Primary Examiner* — William Bashore
*Assistant Examiner* — David Phantana-angkool
(74) *Attorney, Agent, or Firm* — King & Spalding L.L.P.

(57) ABSTRACT

A method for generating an object processing platform between an object computer and a processing computer, where an ad hoc assembly of screens is performed by the object computer with the processing computer in order to couple their input and/or output device. The invention includes generating an object processing platform between an object computer and a processing computer. An ad hoc screen assembly is performed by the object computer with the processing computer in order to couple their input and/or output device with at least one display.

9 Claims, 5 Drawing Sheets

U.S. PATENT DOCUMENTS

| | | | | |
|---|---|---|---|---|
| 6,125,369 A * | 9/2000 | Wu et al. | | 707/201 |
| 6,445,400 B1 * | 9/2002 | Maddalozzo et al. | | 715/803 |
| 6,545,669 B1 * | 4/2003 | Kinawi et al. | | 345/173 |
| 6,842,795 B2 * | 1/2005 | Keller | | 710/15 |
| 7,010,755 B2 * | 3/2006 | Anderson et al. | | 715/778 |
| 7,222,305 B2 * | 5/2007 | Teplov et al. | | 715/751 |
| 7,464,338 B2 * | 12/2008 | Sato | | 715/750 |
| 7,519,910 B2 * | 4/2009 | Saka | | 715/748 |
| 7,567,233 B2 * | 7/2009 | Garibaldi et al. | | 345/157 |
| 2001/0004254 A1 * | 6/2001 | Okahara et al. | | 345/157 |
| 2002/0060701 A1 * | 5/2002 | Naughton et al. | | 345/853 |
| 2003/0227745 A1 * | 12/2003 | Khoo | | 361/686 |
| 2004/0085328 A1 * | 5/2004 | Maruyama et al. | | 345/619 |
| 2005/0235223 A1 * | 10/2005 | Arend et al. | | 715/792 |
| 2006/0230030 A1 * | 10/2006 | Volpa et al. | | 707/3 |
| 2009/0183088 A1 * | 7/2009 | Saka | | 715/751 |
| 2009/0217177 A1 * | 8/2009 | DeGrazia | | 715/753 |

* cited by examiner

METHOD FOR GENERATING AN OBJECT-PROCESSING PLATFORM BETWEEN TWO COMPUTERS BY JOINING SCREENS

FIELD OF TECHNOLOGY

The present disclosure relates generally to generating an object processing platform between two computers by assembling screens.

BACKGROUND

Currently, a file transfer between two terminal devices, for example, between PDAs (PDA: Personal Digital Assistant), between PCs (PC: Personal Computer) or between PDA and PC, requires a certain amount of overhead. Computers are to be understood generally as also meaning mobile terminals of communications technology such as, for example, cell phones or mobile telephones.

A great deal of software must be installed in the computers in order to perform a file transfer of this kind or a general object transfer. After this, it is only possible to perform the file transfer between these two terminal devices. At the same time, the user must understand the technology via which he or she wishes to perform the transfer. This means the user has to start a Bluetooth manager if he or she wants to transfer the file via Bluetooth. Specifically, he or she must select the file to be transferred in this manager and determine the destination. It may also be necessary to select a specific conversion format. An analogous procedure applies to cable-connected and infrared transmission. On the other hand, techniques and methods are known for connecting two or more screen to form a large-area display as well as for coupling the input means, such as, for example, mouse and keyboard.

There are many different reasons for using a spontaneous screen assembly or a spontaneous combination or joining together of display devices (ad hoc collaboration display). A screen assembly is to be understood as meaning, for example, the combining of a plurality of screens to create what is referred to as a large-area display. Furthermore the linking of displays, as a standalone device or integrated in a data processing system, is also to be generally understood as such. The following statements concentrate on the graphical control of screens or displays, basically involving the drawing of objects on a display. Apart from said control of screens, the techniques used for this also include the control of input means such as, for example, keyboards, mice and the like. All these means for user interface for an electronic data processing device as well as for a stationary or mobile communication terminal are integrated in the same processing layer in virtually all operating systems.

The starting point is, for example, the display of a mobile telephone or of a PDA (Personal Digital Assistant). Thus, for example, a group of people referred to as an ad hoc community wish to view a document together in a collective environment or even work collaboratively in the document. A document, in this context, is to be understood as meaning any representation of a file. Other persons with, for example, mobile phones wish to process their data on a shared large-area display skipping the synchronization step.

In a domestic setting, the occupants want to be able to view all the content or status of the devices and appliances contained in the home on a central display. The content includes, for example, incoming SMS messages to the cordless or corded telephones or the messages from a running washing machine or dishwasher, which are displayed on the screen of a television set. Furthermore, devices without their own display can be controlled via a mobile phone's display brought along, as it were, by the user. The following techniques are known for controlling display devices or displays.

The typical method of an operating system OS controlling a screen SCR or display device is described with reference to FIG. 1. A computer or PDA normally has a single display. The operating system OS accesses an object library WSL (WidgetSet Library). In addition to the operating system OS, as the standard application, as it were, the applications APP installed in the computer generally make use of the object library WSL. Based on the addressing carried out by the applications APP, the object library WSL generates the desired objects, which is to say it draws the objects and passes these on to the screen driver SDD (Screen Device Driver). In addition to icons and other symbols, graphic characters and other displayable characters should also be understood to mean objects or interaction objects. The screen driver SDD edits the objects for the graphics card GC, which then controls the screen SCR directly and displays the objects thereon. However, it is not possible to change the screen size.

Figure 2:
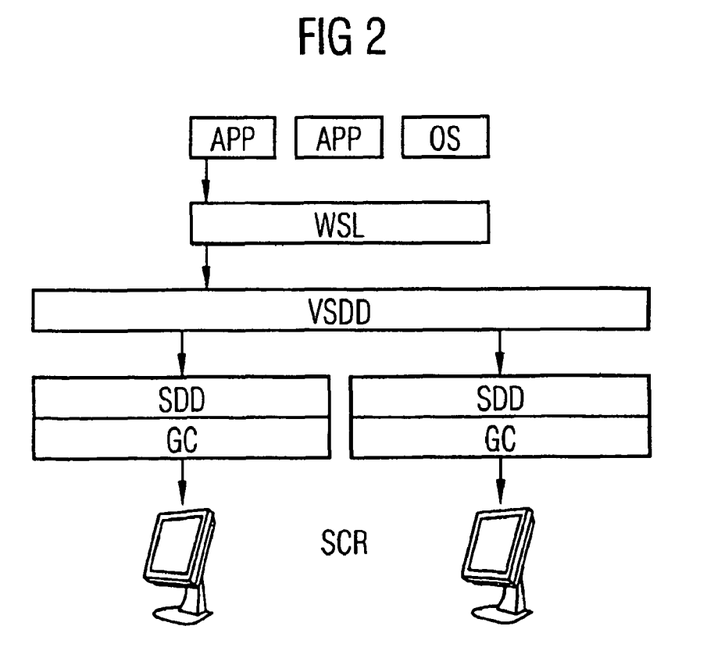
FIG. 2 illustrates a known arrangement for controlling a large-area screen composed of individual screens.

FIG. 2 illustrates a modem operating system OS, such as, for example, Win2000, WinXP, Linux-X11R6-Xfree86 and others. An operating system OS of this kind can control multiple screens SCR (known as Xinerama feature in Xfree86). For this purpose, the operating systems OS generally use a virtual layer, known as a virtual screen driver VSDD. The virtual screen driver VSDD is inserted between the object library WSL and the screen driver or screen drivers SDD. The virtual screen driver VSDD operates as a front-end connecting element for two, as shown in the figure, or more screen drivers SDD for the simultaneous control of the same number of displays SCR.

The virtual screen driver VSDD imitates or, more precisely, simulates a single screen SCR for the object library WSL. Although the single screen has twice the height or twice the width of a single one of these screens SCR. Height or width are in this case dependent on the settings selected by the user. The same applies analogously to more than two screens SCR. The virtual screen driver VSDD handles the task of passing the objects output by the object library WSL via the associated screen driver SDD to the corresponding graphics card SC, and thus enables the objects to be displayed at the correct position on one of the screens SCR. The representation is completely transparent to the application APP and can be moved freely over the two screens SCR and stretched and extended over both screens SCR. The virtual screen driver VSDD handles the two screens SCR as a single, physically present screen SCR with twice the size. In this case, only individual screens SCR can be joined together to form a large-area image, the screens being controlled from one and the same platform.

Figure 3:
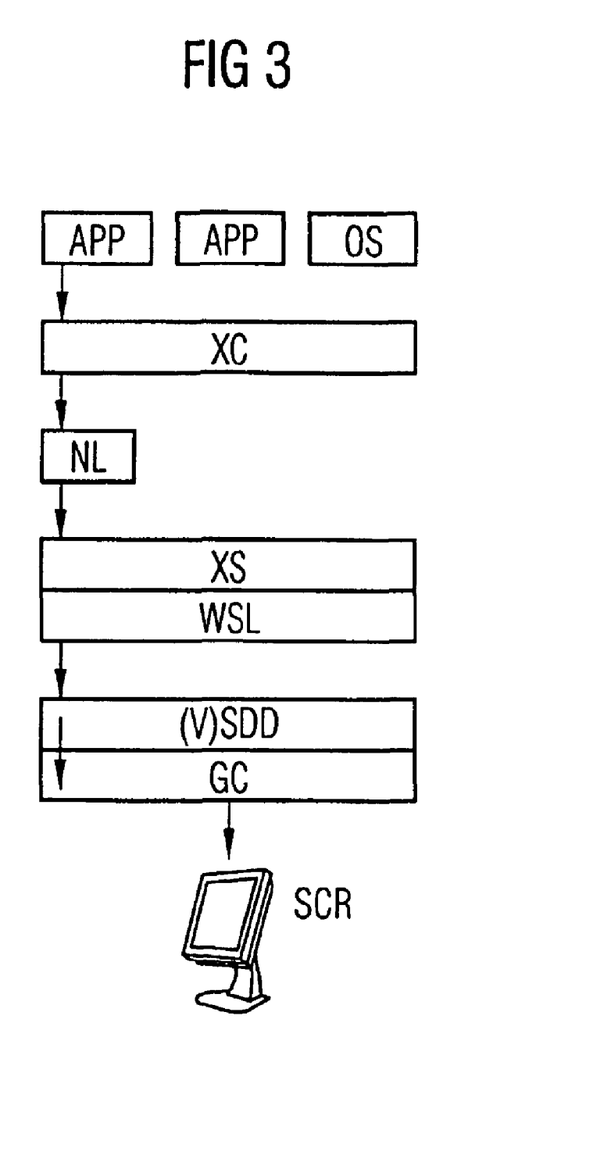
FIG. 3 illustrates a known arrangement for controlling a screen remotely from a remote computer.

FIG. 3 shows a variant in which the computer and the display device SCR are no longer at the same location, but are connected to each other via what is known as a client/server application. An X client XC, for example an X11R6 client, is disposed in the local computer and receives the corresponding data records from the applications APP or, as the case may be, the operating system OS. The computer, more particularly the X client XC, is connected to an X server XS via a network NL (Network Layer). The network layer NL can be implemented by way of a wired or wireless communication network or a computer connection network. The data communication via the network layer NL takes place on the basis of a correspondingly embodied protocol, which does not need to be dealt with in further detail here.

Figure 1:
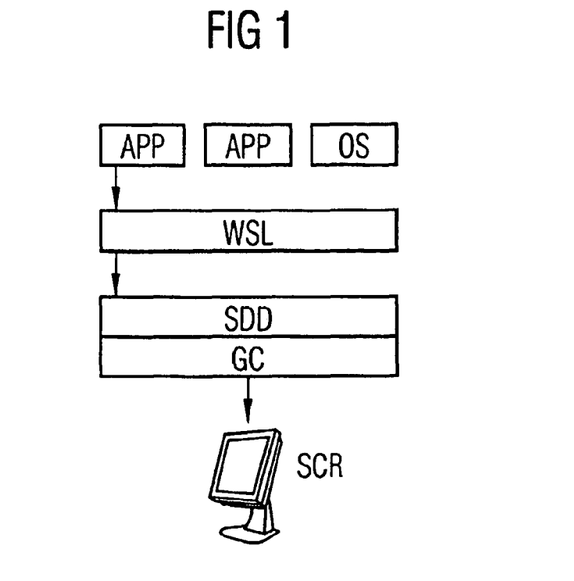
FIG. 1 illustrates a known arrangement for controlling a screen by way of a computer.

This configuration largely corresponds to the configuration shown in FIG. 1, with the client/server application, consisting of the X client XC, the network layer NL and the X server XS, being disposed between the applications APP, the operating system OS and the following object library WSL. The object library WSL with the front-end X server XS, the screen driver SDD or, as the case may be, the virtual screen driver VSDD, and the graphics card SC as well as the screen SCR are embodied as a further computer or as a remotely located computing system. In a variant hereto the screen driver SDD is replaced by the virtual screen driver VSDD already described in the foregoing with reference to FIG. 2. This variant enables a plurality of screens SCR to be controlled. (This scenario is not depicted in any greater detail in the figure). This variant is a hybrid solution in which the local screen controller is replaced by a screen controller controlled via the network. This is, as it were, a remote screen controller.

Figure 4:
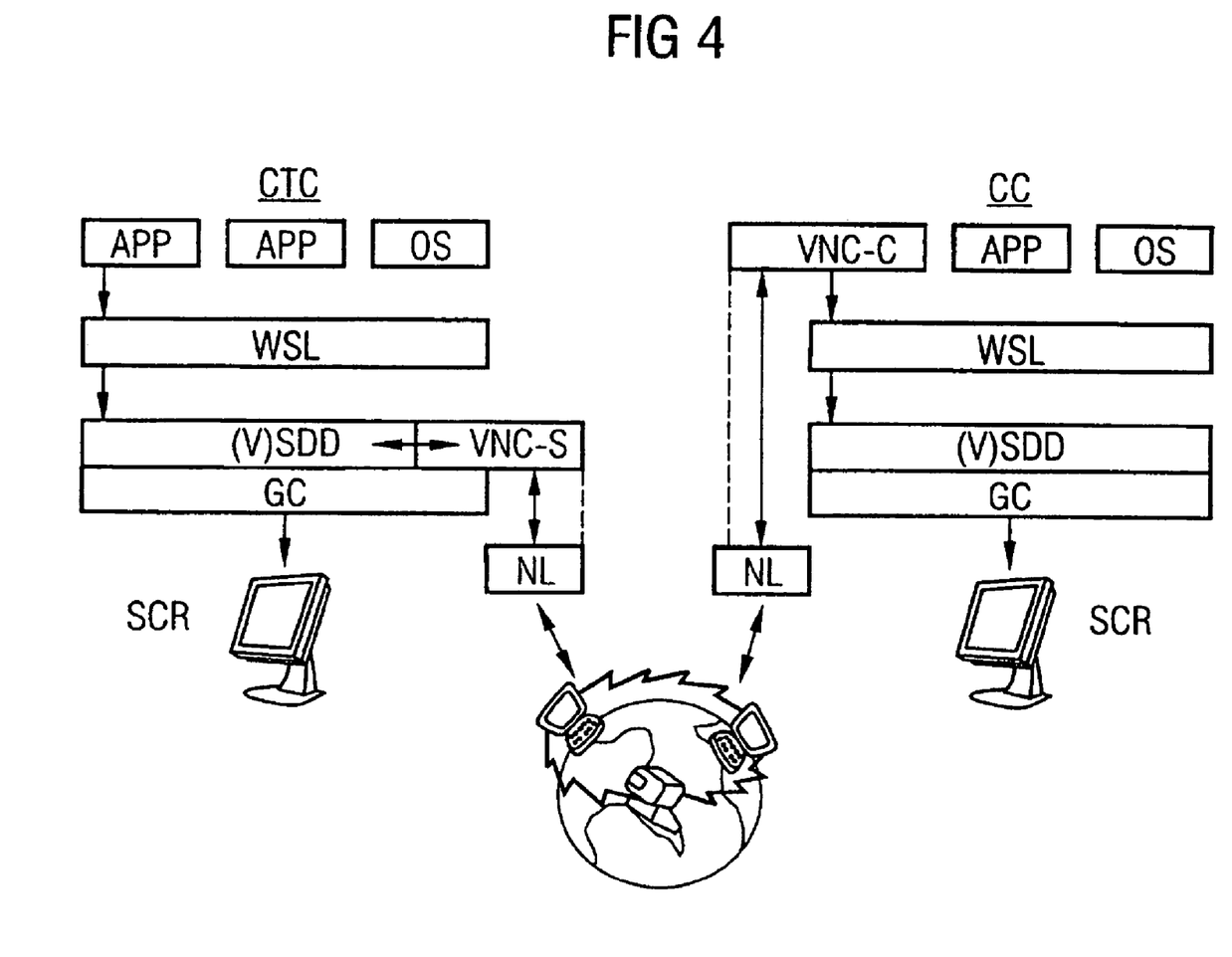
FIG. 4 illustrates a known arrangement for controlling a screen remotely via a virtual network computer.

FIG. 4 shows what is referred to as a display controlled over the network. In this arrangement there is, on one hand, a client computer CC having an application APP and an operating system OS, an object library WSL, a screen driver SDD or virtual screen driver VSDD, a graphics card GC and a screen SCR. Disposed on the other side is a computer CTC (Computer To be Controlled) that is to be controlled or remotely controlled and which has the same units. The two computers CC and CTC are connected via what is called a virtual network computer (VNC). This network may in principle be the WWW (World Wide Web). The virtual network computer VNC is in the proper sense a protocol which accepts the input and output data, converts it into, for example, a serial form and sends it to a client application running somewhere in the network.

For the purposes of data exchange or data transfer the client computer CC has a VNC client VNC-C, which is connected to a data or communication network via the network layer NL already known from FIG. 3. The VNC client VNC-C is integrated into the computer CC analogously to an application APP. For the purpose of handling the data traffic, the computer to be controlled CTC has what is referred to as a VNC spy VNC-S that is likewise connected to the network layer NL. The VNC spy VNC-S is, for example, directly connected to the (virtual) screen driver (V) SDD in the computer CTC.

This arrangement enables the client application to take full control of the computer to be controlled CTC. In this case, the user works on the client computer CC in the same way as if he or she were sitting in front of the screen SCR of the computer to be controlled CTC. When the virtual network computer VNC is used, the data exchange can be interrupted and resumed from a different location, with the display settings, such as number and arrangement of the windows in windows, the position of the mouse pointer, etc., being preserved as they were prior to the interruption. Microsoft uses a similar configuration to this under the name "pcAnywhere." With combined screens, objects or files can be moved over the entire virtual screen. The associated application or, as the case may be, the file processing function runs on the control computer.

Therefore, the invention addresses the need in the art for a more convenient and user-friendly way of transferring objects between computers.

SUMMARY

The present disclosure relates to a method for generating an object processing platform between an object computer and a processing computer, wherein an ad hoc assembly of screens is performed by the object computer with the processing computer in order to couple their input and/or output means.

The method of the present invention includes generating an object processing platform between an object computer and a processing computer. An ad hoc screen assembly is performed by the object computer with the processing computer in order to couple their input and/or output means with at least one display. The display (2) belongs to the processing computer having an interaction area (IA2) via which a local file processing function can be activated, The object processing platform is generated by moving an object from a display (1) belonging to the object computer to the interaction area (IA2) of the display (2) belonging to the processing computer. The local processing function is activated by means of a local coupling of the object to the interaction area (IA2).

The application-specific processing of the object is started by a further coupling of the object to an application icon on the display (2) belonging to the processing computer. Additionally, the object-computer-specific data of the object is converted into application-specific data.

BRIEF DESCRIPTION OF THE FIGURES

The various objects, advantages and novel features of the present disclosure will be more readily apprehended from the following Detailed Description when read in conjunction with the enclosed drawings, in which.

DETAILED DESCRIPTION

Figure 5:
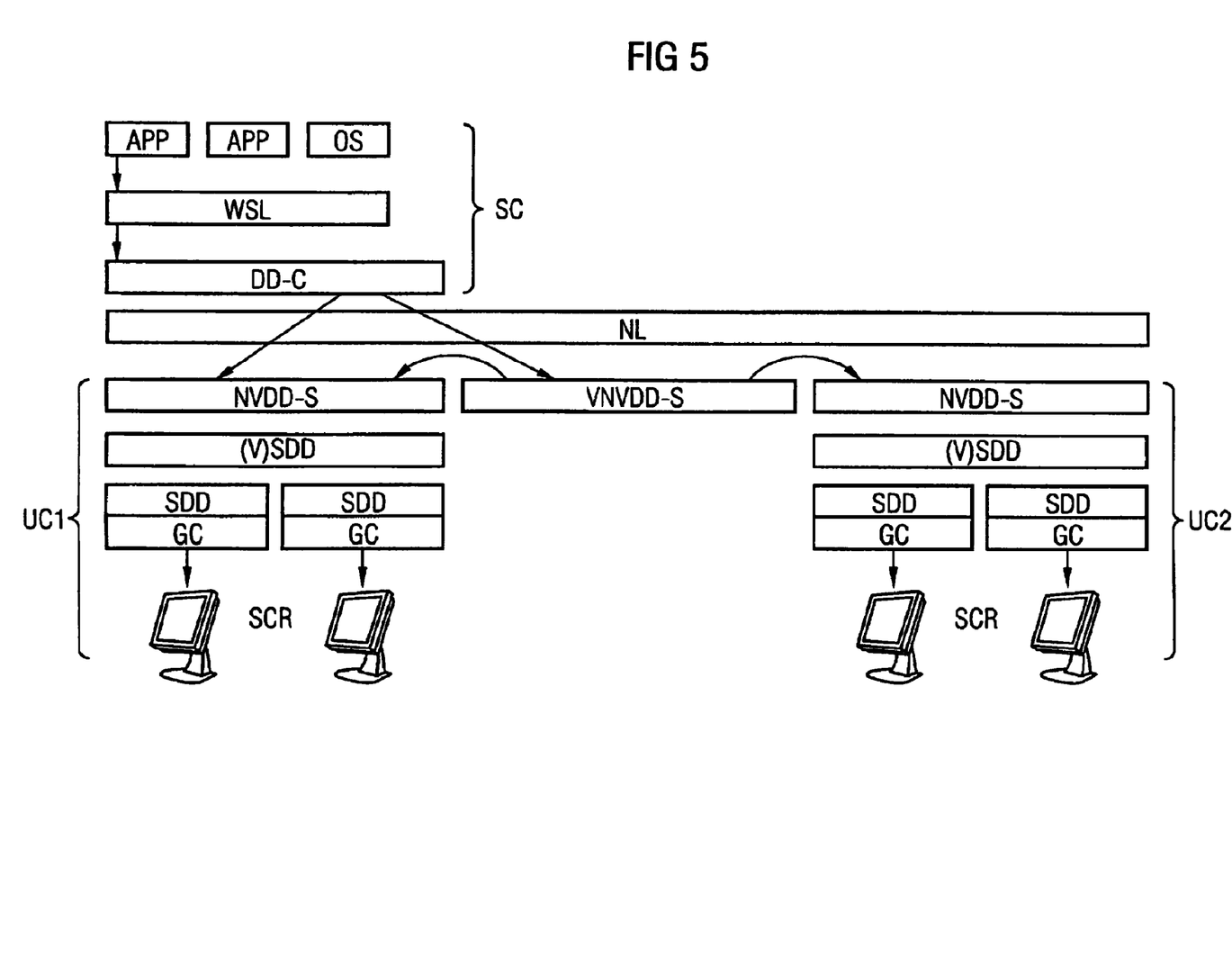
FIG. 5 illustrates a possible arrangement for ad hoc assembly of screens in accordance with an embodiment of the invention.

FIG. 5 illustrates a possible arrangement for ad hoc assembly of screens in accordance with an embodiment of the invention. The invention is based on at least two assembled screens. FIG. 5 illustrates the essential components for a possible screen assembly, a control computer SC with applications APP, an operating system OS and an object library WSL, as described in FIG. 1 as a computer or PDA. The control computer SC has a screen driver client DD-C (Device Driver Client). In a pictorial representation the applications APP make use of the object library WSL in order to draw graphical objects or components. The object library WSL draws these objects onto the screen driver client DD-C.

The screen driver client DD-C passes on the drawn objects, either to a virtual screen driver service in the network NVDD-S (Networked Virtual Device Driver Service) or to a virtual screen driver service in the virtual network VNVDD-S (Virtual Networked Virtual Device Driver Service). Protocols are used between client DD-C and screen driver service VNVDD-S for passing on the objects. The protocols in principle tunnel the corresponding data through the layers of the transmission media. The transmission medium is, for example, the network layer NL.

In the following explanation of the screen combination, the components which are used by the screen driver client DD-C are referred to in abbreviated form for the sake of simplicity. In a first possible variant, the client DD-C uses a virtual screen driver service in the network NVDD-S, which service operates in the network NVDD as what is termed a virtual screen driver. The virtual screen driver in the network NVDD is (together with the screen driver SDD and at least one screen SCR as well as the associated graphics card GC) part of computers UC1 or UC2 (Used Computer). If two screens SCR are used, the already known virtual screen driver VSDD is used.

In a second possible variant, the client DD-C uses a virtual screen driver service in the virtual network VNVDD-S, which service operates in the virtual network VNVDD as what is termed a virtual screen driver. In principle, the screen driver VNVDD acts in a similar manner to the virtual screen driver VSDD described in FIG. 2, which simulates a single screen driver SDD in place of the two physically present drivers SDD toward the object library WSL. The difference between the two virtual screen drivers NVDD and VNVDD is the following. The virtual screen driver in the network NVDD can control the hardware, i.e., the graphics card GC, directly. If the screen driver client DD-C uses the virtual screen driver in the network NVDD, the driver tunnels the information or objects to the driver SDD via the virtual screen driver VSDD, as necessary. In this case the screen driver NVDD must run on the computer UC1 or UC2 in which the corresponding graphics card GC is running.

The virtual screen driver in the virtual network VNVDD searches in the network layer NL for any available virtual screen driver in the network NVDD or for any further virtual screen driver in the virtual network VNVDD. For this purpose, the driver VNVDD uses what are referred to as service discovery protocols. If the screen driver client DD-C uses the virtual screen driver in the virtual network VNVDD, the driver takes over control of the assembled display, i.e., of the screen or screens SCR. The screen driver VNVDD can run anywhere in the network layer NL, even on computers that have no graphics cards of their own. A scenario for an ad hoc screen assembly is described below. The components used are a PDA (Personal Digital Assistant) and a personal computer (PC), both of which are networked for example via a WLAN (Wireless LAN). Both systems PDA and PC are equipped for operation with a virtual screen driver in the network NVDD, and the PDA is additionally equipped for operation with the virtual screen driver in the virtual network VNVDD.

The user of the PDA would like, for example, to have at his or her disposal for a certain period of time a larger screen than the PDA can provide him or her. He or she would also like to use the mouse of the PC as input means. The PDA is started and after a corresponding application is called the graphical initialization routine attempts to establish a connection to a virtual screen driver in the virtual network VNVDD. The screen driver VNVDD searches in the WLAN for virtual screen drivers in the network NVDD and for further virtual screen drivers in the virtual network VNVDD. It will find at least two screen drivers NVDD, the PDA and the PC. After a corresponding protocol exchange, the screen driver VNVDD on the PDA will either propose a configuration for the two screens of PDA and PC, or it will perform a setting in accordance with the user's defaults. In both cases, the user will be prompted for approval, for example.

Figure 6:
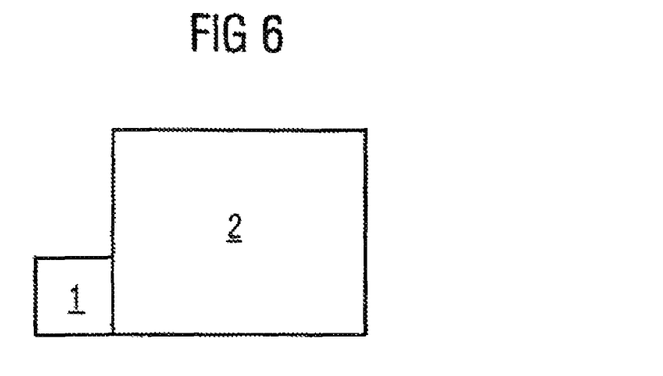
FIG. 6 illustrates a scenario for combining screens in accordance with an embodiment of the invention.

FIG. 6, illustrates a scenario for combining screens in accordance with an embodiment of the invention. In FIG. 6, the comparatively small screen 1 of the PDA supplements the display 2 of the PC at the lower left-hand edge. The screen driver VNVDD detects the object library WSL of the PDA. The object library WSL begins to draw on the screen 1. The user can now decide whether he or she wants to move the application or the associated characters, such as text, drawing and graphics in general, to the right onto the screen 2. A partial shifting of the object representation is also possible here, so one half appears on the display 1 and the other half on the display 2, for example. The user can also use, for example, the mouse and the keyboard of the PC for the inputs, actually on the PDA. Since the PDA is the device on which the application started by the user is running, all the input/output data is controlled from the PDA alone. At no time does this application run on the PC itself.

Figure 7:
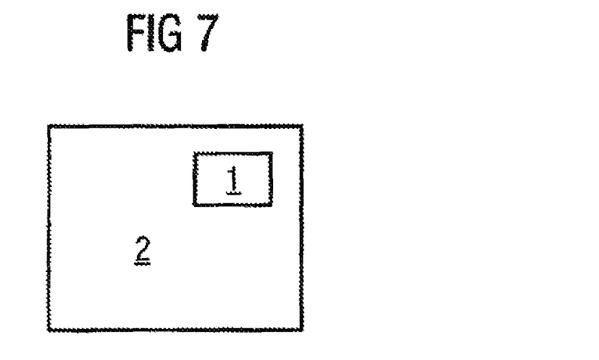
FIG. 7 illustrates a further scenario for combining screens in accordance with an embodiment of the invention.

FIG. 7 illustrates a further scenario for combining screens in accordance with an embodiment of the invention. In FIG. 7, a device is used, which has no screen of its own. This device searches, for example, periodically or when triggered by an operator at the press of a button, for a virtual screen driver service in the network or for a virtual screen driver service in the virtual network via one or more network interfaces such as Bluetooth, WLAN, Serial or the like. As soon as a virtual screen driver service is found in the network, the main application begins drawing the objects. The screen driver service runs, for example, on the notebook or the PDA of a further network user. In this case, the protocol is the same as that previously used, with the sole difference that the further user can control the device remotely, being able to switch it off, for example. The combined screen is illustrated in FIG. 7. The display 1 of the device, projected over the network, can be located within the larger (in terms of surface area) display 2 of the notebook.

Figure 8:
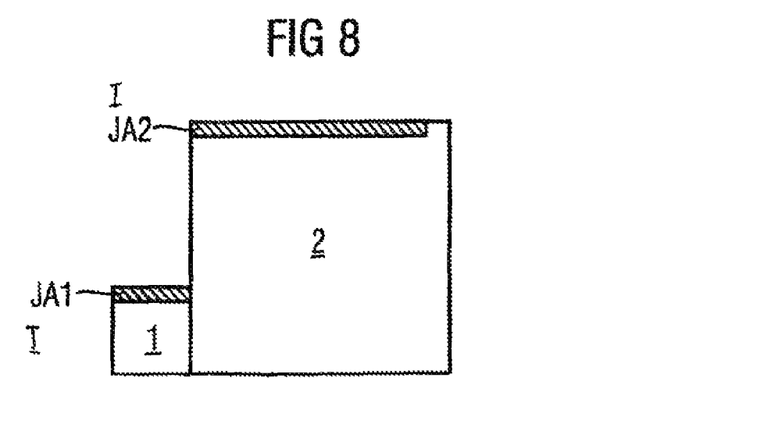
FIG. 8 illustrates a scenario for object transfer in accordance with an embodiment of the invention.

The screen assembly enables GUI (Graphical User Interface) objects to be moved over or positioned on the area of the two displays as though a single, enlarged display were present. In addition, the input means of the terminal devices involved are at the user's disposal. The technology used for the implementation is of secondary significance for the invention. According to the invention, an interaction area IA1 and IA2, respectively, is inserted on the displays 1 and 2 involved in the screen assembly. The area IA1, IA2 is, for example, a bar at the top edge of each screen, as illustrated in FIG. 8. The interaction areas IA1 and IA2 can also be implemented embodied in terms of area or by means of fields on a touch-sensitive screen; in principle a key combination is also feasible. The operating principle of the interaction areas IA1, IA2 is described in more detail below.

If the user moves a positioning symbol, for example, a mouse pointer, into the interaction area IA1 or IA2, the associated display 1 (for PDA) or 2 (for PC) changes into the usual local PDA or PC display. This display 1 or 2 then no longer shows the corresponding part of a combined or virtual display. If the assembled screen has the configuration illustrated in FIG. 7, no additionally designated interaction area needs to be present. In this case, the combined screen is a window on the display 2. It is then possible to position the mouse pointer outside of the display 1, i.e., on the desktop of the associated PC for example.

FIG. 8 illustrates another scenario for object transfer in accordance with an embodiment of the invention. In FIG. 8, the user transfers an object from the PDA (belongs to the display 1) to the PC (belongs to the display 2). An object of this kind may be a file, an image or, for example, a clipboard. In a first step, using one of the above described techniques, the user generates an assembled display from the device-specific displays 1 and 2. In the next step, the user moves an object, for example a document, from screen 1 across to the interaction area IA2 of screen 2, which he or she uses the DragNDrop technique familiar from Windows. After a typical waiting period or as a result of the object being placed on the interaction area IA2, the display 2 switches to the customary local display mode for the associated terminal device, in this case for the PC. Finally, a file processing platform is generated by the local coupling of object and interaction area IA2.

In this case, there is no file transfer from PDA to the PC involved. Instead, the original file remains on the PDA and only the processing is performed on the PC, with the terminated file being stored back on the PDA once more. In a GUI-oriented system, the selected application can be started by placing the transferred object on an associated icon. In this way, a logical link is established between an application running on the PC and the object or the associated data on the PDA. If necessary, the moved file is also converted. Thus, for example, a typical wrd document under Psion (for PDA) will be converted into a typical doc document under Windows (for PC). Any desired object bus technology such as, for example, SOAP, JINI, etc., can take over the object and call, process and save back the associated data.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method for generating an object processing platform between an object computer and a processing computer, wherein the object computer is configured to generate a local object computer graphical user interface (GUI) displayed by the object computer, wherein the processing computer is configured to generate a local processing computer GUI displayed by the processing computer, and wherein an ad hoc screen assembly is performed by the object computer with the processing computer to couple a respective input and/or output device, the method comprising:

the object computer initiating a generation of an assembled display combining (a) an object computer portion displayed on at least a portion of a display belonging to the object computer and (b) a processing computer portion displayed on at least a portion of a display belonging to the processing computer, the assembled display having a display interface defined by a boundary of the object computer portion and a boundary of the processing computer portion, the interface of the assembled display allowing a displayed object to be dragged by a user across the display interface from the object computer portion to the processing computer portion, wherein the displayed object dragged across the display interface crosses the boundary of the object computer portion such that it is no longer displayed on the object computer portion and crosses the boundary of the processing computer portion such that it appears on the processing computer portion, in response to a user dragging the displayed object across the display interface of the assembled display from the object computer portion to the processing computer portion, and further dragging the displayed object to an interaction area of the processing computer portion, automatically causing the display belonging to the processing computer to switch from displaying the processing computer portion of the assembled display to displaying the local processing computer GUI and automatically generating an object processing platform, and activating a local file processing function by means of a local coupling of the object to the interaction area.

2. The method according to claim 1, further comprising an application-specific processing of the object is started by a further coupling of the object to an application icon on the display belonging to the processing computer.

3. The method according to claim 2, wherein the object-computer-specific data of the object is converted into application-specific data.

4. A system comprising:

a processing computer configured to generate a local processing computer graphical user, interface (GUI) displayed by the processing computer, object computer configured to generate a local object computer GUI displayed by the object computer, and further configured to initiate a process for generating an assembled display combining (a) an object computer portion displayed on at least a portion of a display belonging to the object computer and (b) a processing computer portion displayed on at least a portion of a display belonging to the processing computer, the assembled display having a display interface defined by a boundary of the object computer portion and a boundary of the processing computer portion, the interface of the assembled display allowing a displayed object to be dragged by a user across the display interface from the object computer portion to the processing computer portion, wherein the displayed object dragged across the display interface crosses the boundary of the object computer portion such that it is no longer displayed on the object computer portion and crosses the boundary of the processing computer portion such that it appears on the processing computer portion, a user input device for dragging the displayed object across the display interface of the assembled display from the object computer portion to the processing computer portion, and further dragging the displayed object to an interaction area of the processing computer portion, which causes the display belonging to the processing computer to automatically switch from displaying the processing computer portion of the assembled display to displaying the local processing computer GUI and automatically generating an object processing platform.

5. The system according to claim 4, further comprising an application-specific processing of the object is started by a further coupling of the object to an application icon on the display belonging to the processing computer.

6. The system according to claim 5, wherein the object-computer-specific data of the object is converted into application-specific data.

7. A system comprising:

a combination of an object computer and a processing computer that define an assembled display combining (a) an object computer portion displayed on at least a portion of a display belonging to the object computer and (b) a processing computer portion displayed on at least a portion of a display belonging to the processing computer, wherein the object computer is configured to generate a local object computer graphical user interface (GUI) displayed by the object computer, wherein the processing computer is configured to generate a local processing computer GUI displayed by the processing computer, wherein the combination defining the assembled display is initiated by the object computer, the assembled display having a display interface defined by a boundary of the object computer portion and a boundary of the processing computer portion, the interface of the assembled display allowing a displayed object to be dragged by a user across the display interface from the object computer portion to the processing computer portion, wherein the displayed object dragged across the display interface crosses the boundary of the object computer portion such that it is no longer displayed on the object computer portion and crosses the boundary of the processing computer portion such that it appears on the processing computer portion, wherein by dragging the displayed object across the display interface of the assembled display from the object computer portion to the processing computer portion, and further dragging the displayed object to an interaction area of the processing computer portion, an object processing platform is generated and the display belonging to the processing computer automatically switches from displaying the processing computer portion of the assembled display to displaying the local processing computer GUI, and wherein a local file processing function is activated by means of a local coupling of the object to the interaction area.

8. The system according to claim 7, further comprising an application-specific processing of the object is started by a further coupling of the object to an application icon on the display belonging to the processing computer.

9. The system according to claim 8, wherein the object-computer-specific data of the object is converted into application-specific data.

* * * * *